(12) United States Patent
Smith

(10) Patent No.: US 7,730,958 B2
(45) Date of Patent: Jun. 8, 2010

(54) METHOD AND APPARATUS TO ENHANCE HYDROCARBON PRODUCTION FROM WELLS

(76) Inventor: David Randolph Smith, 3100 Regent St., Kilgore, TX (US) 75662

( * ) Notice: Subject to any disclaimer, the term of this patent is extended or adjusted under 35 U.S.C. 154(b) by 20 days.

(21) Appl. No.: 11/846,330

(22) Filed: Aug. 28, 2007

(65) Prior Publication Data
US 2008/0066918 A1 Mar. 20, 2008

Related U.S. Application Data

(60) Provisional application No. 60/824,228, filed on Aug. 31, 2006.

(51) Int. Cl.
*E21B 43/22* (2006.01)
(52) U.S. Cl. .................. 166/402; 166/279; 166/300; 166/303; 166/371
(58) Field of Classification Search .................. None
See application file for complete search history.

(56) References Cited

U.S. PATENT DOCUMENTS

| 3,981,361 | A | * | 9/1976 | Healy ..................... 166/252.1 |
| 5,114,599 | A | | 5/1992 | Debons et al. |
| 5,358,046 | A | * | 10/1994 | Sydansk et al. ............. 166/275 |
| 6,581,687 | B2 | | 6/2003 | Collins et al. |
| 7,231,976 | B2 | | 6/2007 | Berry et al. |
| 2002/0125010 | A1 | | 9/2002 | Collins et al. |
| 2006/0096757 | A1 | | 5/2006 | Berry et al. |
| 2007/0107897 | A1 | * | 5/2007 | Dahanayake et al. ........ 166/271 |

FOREIGN PATENT DOCUMENTS

RU 2213206 C1 9/2003

OTHER PUBLICATIONS www.wikipedia.com—Wikipedia Reference "Supercritical Carbon Dioxide" (undated).*
Green et al., "Enhanced Oil Recovery", Society of Petroleum Engineers Textbook Series vol. 6; Copyright 1988 Society of Petroleum Engineers, ISBN 978-1-55563-077-5.
Ruzyllo, "Supercritical Fluid Cleaning", online http://www.semiconductorglossary.com/notes/ViewFile.asp?which=55 ; Semiconductor Note 8, posted Aug. 20, 2003, 1 page.
Canadian Office Action issued Aug. 11, 2009 during prosecution of Canadian Application No. 2,599,553.

* cited by examiner

*Primary Examiner*—Zakiya W. Bates
(74) *Attorney, Agent, or Firm*—Fulbright & Jaworski, LLP

(57) ABSTRACT

This invention teaches methods and compositions to enhance oil and gas recovery from reservoirs. The methods and compositions disclosed enhance hydrocarbon recovery and fluid disposal in subterranean reservoirs by injecting microemulsion fluids with supercritical fluids, water, or an alternating injection phase of each fluid.

17 Claims, 1 Drawing Sheet

METHOD AND APPARATUS TO ENHANCE HYDROCARBON PRODUCTION FROM WELLS

CROSS-REFERENCE TO RELATED APPLICATIONS

This application claims priority to, and incorporates by reference, U.S. provisional application Ser. No. 60/824,228, filed Aug. 31, 2006.

BACKGROUND OF THE INVENTION

Microemulsions are a broad class of micro- and nano-sized fluid particles. They can achieve very low surface tension, can simultaneously have oil, water, surfactant phases, and can be designed to transport a wide variety of chemicals in different thermodynamically stable phases. Specifically, in some supercritical fluids like $CO_2$ used for Enhanced Oil Recover (EOR) projects in the oil and gas industry, the addition of certain microemulsions enhance the supercritical fluids' ability to dissolve highly polar, ionic, high molecular weight species. These high molecular weight species are often found in oil and gas EOR reservoirs.

A microemulsion is a mixture of water, water insoluble and water soluble components forming a visually homogeneous, transparent liquid. One or more active ingredients may be present in the aqueous phase, the non-aqueous phase, or in both phases. A variety of microemulsion formulations may be prepared in which the aqueous phase can be considered the dispersed phase, the continuous phase or, alternatively, where the two phases are considered to be bi-continuous. In all cases microemulsions will disperse into water to form either conventional emulsions or dilute microemulsions. Microemulsion solutions form a unique class of emulsions normally consisting of an aqueous phase, and oil phase and a surfactant phase. This class of emulsion is very small, in the nano- to micro-meter range, is usually optically clear and thermodynamically stable, as opposed to other emulsions that are kinetically stable; and microemulsions normally have low viscosities and ultra low interfacial tension properties. The formation of a microemulsion requires the appropriate blending of an oil phase, a water phase, and at least one surfactant. It is often necessary to add salts to enhance the thermodynamic stability of the emulsion depending on the specific blend of the solution. Non-limiting examples of compositional blends that can be used to form a microemulsion include solutions consisting of 13%-55% of fluids from the turpene group (examples include limonene and others), 0%-30% isopropanol, 0-50% water, 0%-50% triethylene glycol, and 0%-15% salts.

The fact that these are very small particles with reduced surface tension allows them to get into low permeability and low porosity subterranean reservoirs. When injecting fluids into subterranean reservoirs during secondary and tertiary recovery to sweep out the hydrocarbons it is useful to be able to get the injection fluid into all areas if the reservoir, including the low permeability and porosity areas of the subterranean reservoir as the higher permeability and porosity structures are most easily recovered and likely have their hydrocarbons significantly or substantially exhausted during the primary recovery phase of the reservoir.

Presently, the use of microemulsions in oil and gas production has been limited to fracturing and acid stimulation operations. Fracturing operations involve the pumping of hydraulic fluids at high pressure (i.e., pressures above the hydraulic fracturing pressure of the reservoir) into the subterranean reservoir formations of the subterranean zone to crack the subterranean reservoir and enhance the subterranean reservoir permeability. This causes hydraulic fracturing of the subterranean formations, and the release of hydrocarbons through the resulting enhanced permeability, thereby improving hydrocarbon recovery. Microemulsions then allow for and enhance the recovery of fracturing fluids used in the operation to be produced back out of the production well reducing fluid damage in the reservoir and thereby increasing the ability of a well to produce from the fracture system made by these fluids.

Blends of microemulsions and supercritical fluids have not been used for the recovery of oil and gas outside of the context of fracturing and stimulation injection operations. For example they have not been used in secondary and tertiary hydrocarbon recovery where supercritical fluids are often used. In fracturing and stimulation operations, the microemulsion is blended in a fracturing or stimulation fluid at low concentrations, typically on the order of 0.2% of the blend. Additionally, microemulsions have not been used as the actual fracturing or stimulation fluid, but only as an additive to a fracturing fluid. Furthermore, the separation and recycling of the microemulsion from a fracture or stimulation fluid has never been performed. Additionally, fluid compositions comprising microemulsions and supercritical fluids have not been used for the enhanced recovery of oil and gas. The present invention permits enhanced recovery of hydrocarbons using microemulsions with supercritical fluids and further provides a method to reduce the cost of the microemulsion application by providing for the separation and recycling of the microemulsion once it is produced back to surface with the well fluids.

BRIEF SUMMARY OF THE INVENTION

In one embodiment of the present invention, there is a method of improving hydrocarbon recovery from a subterranean hydrocarbon reservoir comprising the step of: injecting a composition comprising a microemulsion fluid into an injection well and then into the subterranean reservoir, the microemulsion fluid comprising: (i) an oil phase, (ii) an aqueous phase; and, (iii) a surfactant; the step of injecting a composition comprises injecting the composition at a pressure below the hydraulic fracturing pressure of the reservoir.

In some embodiments, the method further comprises heating the fluid prior to said step of injecting.

In some embodiments, the composition further comprises a supercritical fluid.

In some embodiments, the supercritical fluid comprises supercritical carbon dioxide.

In some embodiments, the aqueous phase is distributed in the oil phase in the form of droplets having a diameter in the range 1 to 1000 nm or in the form of micro domains having at least one dimension of length, breadth or thickness in the range 1 to 1000 nm.

In some embodiments, the method further comprises the step of blending the microemulsion fluid with other fluids.

In some embodiments, the method further comprises the step of injecting the composition into a production well.

In some embodiments, the method further comprises heating the fluid prior to the step of injecting.

In some embodiments, the method further comprises blending the microemulsion fluid with a component selected from the group consisting of carbon dioxide, methane, ethane, propane, nitrogen, air, water, and any combination thereof.

In some embodiments, the method further comprises the step of recovering at least a portion of the microemulsion fluid from produced fluids.

In some embodiments, the method further comprises the step of re-injecting said recovered microemulsion into said injection well.

In some embodiments, the step of injecting comprises continual injection.

In some embodiments, the step of injection comprises sequentially injecting more than one microemulsion fluid blend.

In another embodiment of the present invention, there is method of improving hydrocarbon recovery from a subterranean hydrocarbon reservoir comprising the step of: injecting a composition comprising a microemulsion fluid and a supercritical fluid into an injection well and then into the subterranean reservoir, the microemulsion fluid comprising: (i) an oil phase, (ii) an aqueous phase; and, (iii) at least one surfactant; the step of injecting a composition comprises injecting the composition at a pressure below the hydraulic fracturing pressure of the reservoir.

In some embodiments, the aqueous phase is distributed in the oil phase in the form of droplets having a diameter in the range 1 to 1000 nm or in the form of micro domains having at least one dimension of length, breadth or thickness in the range 1 to 1000 nm.

In some embodiments, the method further comprises heating the fluid prior to the step of injecting.

In some embodiments, the supercritical fluid comprises supercritical carbon dioxide.

In some embodiments, the method further comprises blending the microemulsion fluid with a component selected from the group consisting of carbon dioxide, methane, ethane, propane, nitrogen, air, water, and any combination thereof.

In some embodiments, the method further comprises the step of recovering at least a portion of the microemulsion fluid from produced fluids.

In some embodiments, the method further comprises the step of re-injecting recovered microemulsion into the injection well.

In some embodiments, the step of injecting comprises continual injection.

In some embodiments, the step of injection comprises sequentially injecting more than one microemulsion fluid blend.

In another embodiment of the present invention, there is a method of improving hydrocarbon recovery from a subterranean hydrocarbon reservoir comprising the step of injecting a composition comprising a microemulsion fluid and a supercritical fluid into a production well and then into the subterranean reservoir, the microemulsion fluid comprising: (i) an oil phase, (ii) an aqueous phase; and, (iii) at least one surfactant; the step of injecting a composition comprises injecting the composition at a pressure below the hydraulic fracturing pressure of the reservoir.

In some embodiments, the aqueous phase is distributed in the oil phase in the form of droplets having a diameter in the range 1 to 1000 nm or in the form of micro domains having at least one dimension of length, breadth or thickness in the range 1 to 1000 nm.

In some embodiments, the injected supercritical fluid and microemulsion are flowed back to surface through the production well.

In another embodiment of the present invention, there is a method of improving the sequestering of gases in a subterranean reservoir comprising the step of: injecting a fluid composition comprising a microemulsion fluid and a supercritical fluid into a well and then into the subterranean reservoir, the microemulsion fluid comprising: (i) an oil phase, (ii) an aqueous phase; and, (iii) at least one surfactant; the step of injecting a composition comprises injecting the composition at a pressure below the hydraulic fracturing pressure of the reservoir.

In some embodiments, the aqueous phase is distributed in the oil phase in the form of droplets having a diameter in the range 1 to 1000 nm or in the form of micro domains having at least one dimension of length, breadth or thickness in the range 1 to 1000 nm.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
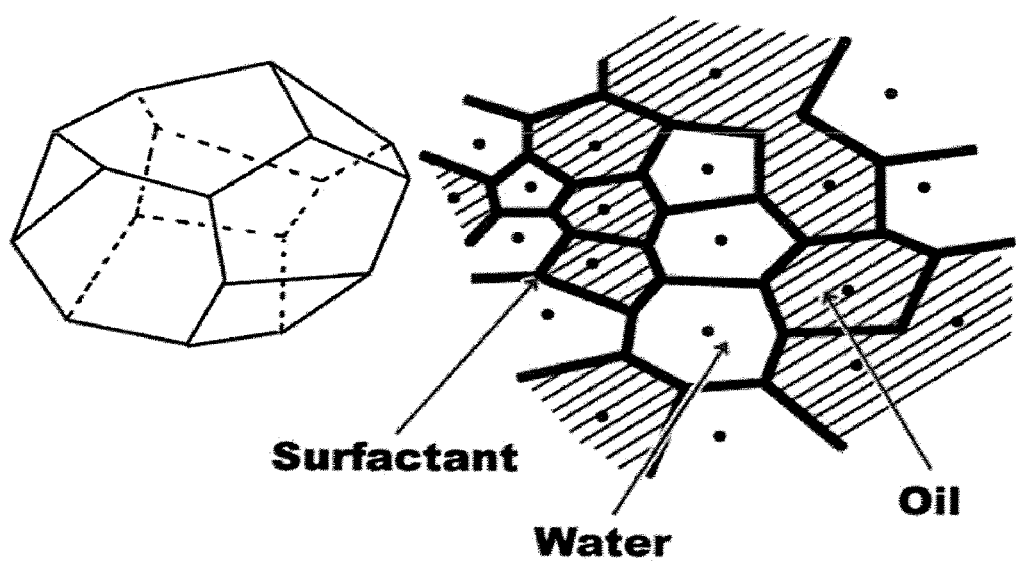
FIG. 1 illustrates that anatomy of a water/oil/surfactant microemulsion, showing the domains of each component and the borders between them.

As used herein, "a" or "an" means one or more. Unless otherwise indicated, the singular contains the plural and the plural contains the singular. In this way, "a microemulsion" means one or more than one microemulsion; "a supercritical fluid" means one or more than one supercritical fluid; "a surfactant" means one or more than one surfactant, "at a pressure below the hydraulic fracturing pressure of the reservoir" means at one or more than one pressure below the hydraulic fracturing pressure of the reservoir, etc.

It is well known to those skilled in the art of fluid injection that one can determine the pressure required to hydraulically fracture a rock (the "hydraulic fracturing pressure" or "hydraulic fracture pressure"). There exists ample literature describing the various methods used to determine the fracture pressure of a given subterranean reservoir. One example is a fluid injection test, often referred to as a "mini-frac" or "step-rate injection test" wherein a fluid of known characteristics of density and friction factors, for example water, is pumped from the surface of a well down the well tubular and into a subterranean interval. This can be performed in any subterranean interval including sandstone, limestone, shale, and coal beds, where the injection pressure is monitored and recorded at a given injection rate and the injection pressure is monitored and recorded on a graph, and where the ordinate axis is the injection pressure at the given injection rate, and the abscissa axis is the injection rate. Starting from a low injection rate, and incrementally increasing the rate for a time interval (typically five minutes), a given injection pressure is obtained with the injection fluid, usually water, and plotted on a graph. While the injection pressure into the subterranean reservoir is below the fracture pressure, the line on the graph formed by the data points of pressure and rate will have a constant slope, until the injection pressure exceeds the subterranean injection intervals fracture pressure. This inflection point on the graph is the hydraulic fracture pressure. One embodiment of the present invention involves the injection of fluids below the fracture pressure. Therefore, the determination of the hydraulic fracturing pressure of a subterranean interval is well-known to those of ordinary skill in the art. Any method of determining the hydraulic fracturing pressure is applicable in the present invention.

A microemulsion fluid particle can move into subterranean reservoir that is water saturated, oil saturated, water wet, or oil wet due to its external phase behavior best shown in FIG. 1. In the microemulsion shown, it can be seen that there are micro-domains dominated by surfactant, by water, and by oil. The micro-domains may comprise droplets. Droplets have a substantially spherical form, while micro-domains can have other, less symmetric, geometries. A microemulsion is herein defined to be a stable biphasic mixture of two immiscible liquids stabilized by a surfactant and usually a co-surfactant. Microemulsions are thermodynamically stable, isotropically clear, form without excessive mixing, and have dispersed droplets usually in the range of 5 nm to 100 nm diameter.

When a hydrocarbon-bearing, subterranean reservoir formation does not have enough energy for the hydrocarbons to be produced to the surface in economic quantities or at optimum rates, reservoir pressure enhancement and enhanced hydrocarbon recovery techniques are employed to increase the recovery of the hydrocarbon reserves. A well bore penetrating a subterranean formation typically consists of a metal pipe (casing) cemented into the original bore hole. Holes (perforations) are placed to penetrate through the casing and the cement sheath surrounding the casing to allow hydrocarbon flow into the well bore and, if necessary, to allow treatment fluids to flow from the well bore into the formation.

These wells are then allowed to flow hydrocarbons and other reservoir fluids to the surface. Eventually, the reservoir pressure will diminish such that fluids will not erupt or flow naturally to the surface, and pumps and other types of artificial lift devices will need to be employed to lift the fluids from the bore to surface. However, at some point the reservoir will not produce sufficient hydrocarbons to the well bore, at which time the so called primary recovery phase is over. The amount of hydrocarbon remaining in the reservoir at the end of this primary recovery may, in some cases, exceed 70% of the original hydrocarbon in place. Hence it is of interest to attempt to recover the remaining hydrocarbon reserves with enhanced methods.

After primary recovery methods are used, enhanced hydrocarbon recovery techniques are sometimes applied to push or mobilize the hydrocarbons from the reservoir. These enhanced techniques are well developed and known to those in the industry and include, among others, water floods, steam floods, $CO_2$ floods, Water Alternative Gas floods (WAG), surfactant floods, VAPEX, Steam Assisted Gravity Drainage (SADG), and even fire floods.

Enhanced hydrocarbon recovery requires that the injected fluid mobilize the hydrocarbon from the subterranean reservoir structure. The voids in the subterranean reservoir may be quite small and the capillary forces required to allow the injection fluid to contact and "sweep" and displace the remaining hydrocarbon from the subterranean reservoir may be quite high. Moreover, it is normally required that fluids injected for enhanced recovery methods be injected below the hydraulic fracture pressure of the reservoir. Hence the injection fluids in enhanced oil recovery processes often bypass significant volumes of un-mobilized hydrocarbon and in certain reservoirs injection fluids cannot be injected below hydraulic fracture pressure. The present invention allows for injections using microemulsions to lower the injection pressure of enhanced hydrocarbon recovery projects and improve the sweep efficiency and solvency, or cleaning of the reservoir, with supercritical fluids and microemulsions.

Application of enhanced recovery methods as described above is a routine part of petroleum industry operations as applied to mature oil reservoirs. This invention further provides a method to use microemulsions to enhance not only oil recovery but also to enhance gas recovery from reservoirs as diverse as shales, micro-dacy sandstone and limestones as well as coal bed methane subterranean reservoirs. Furthermore, the methods of the invention are used to lower injection pressures in enhanced recovery methods, as well as for disposal by subterranean sequestering of $CO_2$. The methods for improving enhanced hydrocarbon recovery projects for reservoir sweep efficiency is a field of active interest as said primary recovery processes can still leave considerable hydrocarbon reserves un-recovered from the reservoir.

Carbon dioxide is a good injection fluid to mobilize hydrocarbons from reservoirs. This fluid has been shown to reduce the in-situ viscosity of hydrocarbons, likely because at commonly-used injection pressures and temperatures, the injected $CO_2$ injected is soluble in many hydrocarbons. This energizes the remaining hydrocarbon fluids and helps to mobilize them out of the reservoir. $CO_2$ and other fluids have a solvency affinity with hydrocarbons. This affinity along with their ability to reduce hydrocarbon viscosity, and their supercritical phase fluid behavior make them attractive EOR fluids. It is also known that the addition of certain microemulsion solvents with these supercritical fluids can enhance the polarity and solvency ability of the fluids. Although $CO_2$ is preferred, other species may also be used as will be apparent to those of skill in the art upon an understanding of the present invention.

However, $CO_2$ and other injected gases and fluids used in enhanced hydrocarbon recovery processes have a tendency to seek out the highest permeability subterranean reservoir in the formation and flow from the injection wells to the production wells via the path of least resistance. The results is that hydrocarbons in a situation wherein the lower permeability and lower porosity subterranean reservoir are poorly swept by the injected gases and fluids. The oil and gas industry has developed a method to address this issue by alternating the injection of the fluids from liquids like water followed by a cycle of injection of gas. This method is known in the industry as Water Alternate Gas (WAG). The water injected in the water cycle phase of the WAG often follows a fluid path in the reservoir different from the path the $CO_2$ follows during the CO2 injection phase. The water often follows to the higher permeability, and because of a higher surface tension and density, it tends to fill the more permeable flow paths with water thereby not allowing the $CO_2$ from rapidly passing through this lower permeability paths from injection well to production well on the next cycle. The water often encapsulates the residual oil in the reservoir in both the high permeability and low permeability sections making it difficult for the $CO_2$ on the next injection cycle to contact the oil still remaining.

Mechanical diversion of $CO_2$ with water, for example, causes the reservoir to be less mobile to oil movement. This means that although the water may give some diversion to the $CO_2$ cycle it also introduces a new set of problems to the mobility of oil in the reservoir. What is needed is a method to reduce the water retention in WAG processes, while improving the injected ability of $CO_2$ and/or other fluids to mobilize the reservoir fluids to the production wells. Higher temperatures and pressures are often associated with deeper wells. What is further needed is a method and composition to enhance the ability of injected fluids, including $CO_2$, to solubilize the remaining hydrocarbons, and to further tailor these secondary solvents to the in-situ hydrocarbons and reservoir conditions of temperature and pressure. The tailoring of the solvents, chemical constituents, relative percentages, and the changing of these parameters over time is accomplished through a process of lab testing cores with hydrocarbons to be produced, developing blends of microemulsions with supercritical fluids, injecting these compositions in the wells, monitoring the response, and changing the chemical constituents and relative percentages of the microemulsion in the injection fluid to enhance volumes of the hydrocarbon produced from reservoir. Hence this process is first lab developed, then applied and modified based on well responses. It is clear to those of skill in the oil and gas industry that this process is continually monitored and modified as well conditions and the nature of the microemulsion and supercritical fluids are varied. For example, the current techniques in the EOR industry use $CO_2$ injection phased by water injection in WAG projects, but do not blend microemulsion fluids and supercritical $CO_2$ to tailor the injection fluid blend to the actual changing reservoir conditions and take advantage of the synergy between microemulsions and supercritical fluids. This invention improves the EOR methods by using microemulsions with supercritical fluids thereby improving the sweep efficiency.

It is well known that microemulsions are able to penetrate substrates with low porosity much better than the current class of macro-surfactant blends. The microemulsions special surface tri-phase behavior further enhances its ability to penetrate either water wet areas in a reservoir or water wet areas with extremely low surface tension characteristics. Microemulsion(s), when combined with supercritical fluids, posses significant synergetic solvent properties which can significantly improve an EOR process. A supercritical fluid is defined as a substance above its critical temperature ($T_c$) and critical pressure ($P_c$). The critical point represents the highest temperature and pressure at which the substance can exist as a vapor and liquid in equilibrium. Common supercritical fluids include, carbon dioxide, water, methane, ethane, propane, ethylene, propylene, methanol, and ethanol. There are others as well.

A method of enhancing hydrocarbon production in EOR projects is herein provided, the method comprising: (a) injecting a microemulsion with the injected flood fluid into production wells and their subterranean formations; (b) producing hydrocarbons from the EOR projects production wells from one or more subterranean formations; (c) separating gases from the liquids produced from the production wells; (d) separating the hydrocarbon fluids from other produced fluids, with one or more of, centrifugal devices, de-emulsion chemicals, settling tanks, membranes, filter media, and heat; (e) recovering some portion of the injection fluids to recycle into the injection wells; (f) recovering some portion of the microemulsion surfactant fluid system; and (g) repeating steps (a) through (f) for as long as economical hydrocarbons can be recovered from the reservoir.

The microemulsions of the present invention preferably comprise (i) an oil phase, (ii) an aqueous phase, and (iii) at least one surfactant. Some non-limiting examples of the oil phase are hydrocarbon oils, fatty acid esters, mineral oils, animal oils, plant oils, synthetic oils, and silicone oils. Some non-limiting examples of the aqueous phase are sodium chloride, hydrogen peroxide, potassium chloride, fresh water, de-ionized water. Some non-limiting examples of surfactants are zwitterionic surfactant, anionic surfactants, cationic surfactants, ethoxylated nonionic surfactant, non-ionic surfactants like, alpha-olefin sulfonate, alcohol ether sulfate, and alcohol sulfate carboxylated alkylphenol alkoxylates, carboxylated linear alcohol alkoxylates, carboxylated branched alcohol alkoxylate, quaternary ammonium halides, cetyltrimethylammonium chloride, secondary or tertiary fatty amine salts. Other examples of the various components known to those of ordinary skill in the art are also applicable in the present invention.

The present invention preferably also uses the injection of microemulsions in wells in oil and gas fields under reservoir pressure maintenance, RPM, or EOR projects.

The preferred embodiment for an EOR project is to first test the hydrocarbon from the reservoir with a variety of surfactants/solvents, water, oils, alcohols, and salts in a microemulsion blend in a core flow test. This flow test is accomplished by placing a subterranean reservoir core, or a simulated core of a subterranean reservoir (often a Bera Sandstone core is used) into a core sleeve, and passing reservoir oil through the core from one end to the other thereby saturating the core of subterranean reservoir or simulated core with reservoir oil. Then the core is flushed with water, followed by $CO_2$ above its critical point, and the resulting oil recovered from this core flow test is recorded where this recorded result becomes the base case from which the following core flow tests using the microemulsion are evaluated, ergo one designs the subsequent microemulsion blend to give the best oil recovery above the base case core flow test. On can iteratively determine an optimum composition.

This test is repeated for a new core, and this time the microemulsion blend developed for this particular oil is added to the $CO_2$ injection cycle, wherein the $CO_2$ and the microemulsion are pumped together through the core and the recovered oil is recorded and compared to the test wherein no microemulsion was added to the $CO_2$ cycle.

This test is then repeated again as before, flushing a core subterranean reservoir with the hydrocarbon oil, then pumping a water phase, this time with the microemulsion in the water phase, followed by the $CO_2$ phase without the microemulsion. The recovered oil from this core test is then recorded and compared to the previous test runs. One then selects an optimal injection method for a given reservoir oil and subterranean reservoir.

An optimal method is defined to be a method and blend(s) that yield the largest volume increase of oil over the core flow test base case. It is well known to those of skill in the art of oil and gas core testing, that the above test is performed in a test cell that can be subjected to reservoir temperatures and pressures while the core is tested with the different methods. Likewise, the above series of test is repeated for a variety of microemulsion blends, allowing an optimum blend of microemulsion to be developed for different hydrocarbons and subterranean reservoir properties. Once the blend for the microemulsion system for a given hydrocarbon, flooding fluid, and in-situ reservoir conditions is selected from the above discussed testing phase, a microemulsion blend is made and delivered to the well sites.

The flooding fluid can be $CO_2$, $CH_4$, $C_3H_8$, $H_2O$ and combinations of these in a WAG method. Special attention should be given to the selection and core testing of the component parts of the microemulsion blend for any reservoir and to the flooding fluids to be used. Once the first microemulsion blend is then selected based on the empirical results of the core testing, it is stored in tanks near the injection fluid pumping plant. The microemulsion is then injected downstream of the injection fluid pumps at the appropriate concentration for the reservoir as discerned from the core testing. During the injection cycle, the microemulsion may be injected in the water phase, the super-critical fluid phase, or in both, depending on the results of the core testing and field experience, and the blended product of microemulsion and the injection fluid are then injected into an injection well. Field experience is used after performing the injection cycle with microemulsions and monitoring in the field the actual results of the injection cycle after the microemulsion was used.

It is clear that the core testing is the initial starting place but that field experience may lead to modifications of the quantities, chemical constituents, and the cycle phase where the chemical is used. This combination of injection fluid and microemulsion fluid is then produced from a different well, typically designated a production well, where the results of a given cycle are based on the increase in oil production from a previous cycle that did not contain the microemulsion. In some embodiments of the present invention, the microemulsion can be injected without other injection fluids, such as water or $CO_2$. In any case, the volume and cost of the microemulsion can be optimized by separating the microemulsion from the produced hydrocarbons at the surface and recovering at least a portion of the microemulsion for recycling back into the injection process.

After some time, and it can be years, the effectiveness of the microemulsion and any combined injection fluid may be reduced by light hydrocarbons being easily swept from the reservoir leaving behind heavy hydrocarbons. The present invention also includes the ability to change the microemulsion blends with time to adapt to the changing needs of the project. For example the chemical constituents and their relative concentrations may be modified to accommodate the change in reservoir conditions. Some embodiments of the present invention also provide that the microemulsion may be switched from down injection wells to being injected down previous production wells and then produced up the previous injection wells. Alternatively, the invention teaches the injection of the microemulsion into a well for a given period of time and the well is allowed to produce back the microemulsion fluid in what is known as a cyclic injection method where the injection well is also the production well. These methods allow for the active microemulsion to reach out into reservoir areas near the injection wells that previously were not contacted by (or were only minimally contacted by) injected microemulsion(s) thereby leaving immobile hydrocarbons. It is also clear that this method can be practiced in any subterranean reservoir, not limited to sandstone or limestone, but also in shales, and not only in oil and condensate reservoirs but also in gas reservoirs.

In another embodiment of the present invention, there is the injection of microemulsions blended with fluids into reservoirs under pressure maintenance programs. In this case, a hydrocarbon fluid is being produced from wells and, in order to prevent the reservoir pressure from dropping below a critical pressure, often the bubble point of the hydrocarbon, it is necessary to inject fluids into injection wells while extracting hydrocarbons from production wells. The fluids most often used are water, carbon dioxide, propane, nitrogen, air, and natural gas. The present invention teaches the blending of microemulsions into the injected fluids, based on lab testing of various microemulsion blends that can be made by varying the relative proportions of the chemical constituents. The blend is then injected into an injection well and producing hydrocarbons (and blend components) up production wells. The produced hydrocarbon and well fluids are separated into gas and liquid streams through conventional industrial separators, settling tanks, centrifuges, membrane, and filer media to allow for the recovery of the microemulsion from the hydrocarbons and other well and injection fluids. Other separation methods, known to those or ordinary skill in the art, are also applicable. Supercritical fluids with the enhanced microemulsion properties can be used to aid in the improved mobility and removal of hydrocarbons like condensates, oil, natural gas, and methane.

A still further embodiment of the present invention is the stimulation of hydrocarbon reservoirs by injecting a blend of microemulsions with supercritical fluids. This embodiment is performed by having a supercritical fluid delivered to the well site in a tanker truck, for example a $CO_2$ transport trailer. The $CO_2$ is first flowed and/or pumped from the $CO_2$ transport truck to a high pressure tri-plex pump, and microemulsion is pumped into the same tri-plex pumping units, the combined fluid of microemulsion and $CO_2$ is then pressurized through the tri-plex pump, transported to the well via a high pressure line connected to the well head and injected down the well tubulars and into the reservoir. The supercritical fluid, in this case $CO_2$, and the microemulsion blend(s) are then flowed back to the surface through the well along with well fluids thereby improving the wells' flowing capacity by the cleaning and solvent mechanism of the microemulsion supercritical fluid blend of the present invention.

In a further embodiment, the supercritical fluid is heated after the pressurization of the fluid through a pump and the microemulsion is then injected into this pressurized and heated supercritical fluid prior to the injection into the well of the combined fluid blend of microemulsion and supercritical fluid. In either case, these flow back fluids are separated into liquid and gas streams and a portion of the microemulsion stimulation fluid is recovered and can be reused in subsequent subterranean injections.

The above methods may be used to sequester gases in a subterranean reservoir. The compositions are injected into a well and then into the subterranean reservoir. Gases to be sequestered into the reservoir are then injected. Alternatively the gases to be sequestered may be injected simultaneously along with the compositions. There is interest in sequestering gases such as $CO_2$ to prevent it from entering the atmosphere and resulting in adverse environmental consequences.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of improving hydrocarbon recovery from a subterranean hydrocarbon reservoir comprising the step of:
    injecting a composition comprising a microemulsion fluid and a supercritical fluid into an injection well and then into said subterranean reservoir, said microemulsion fluid comprising:
    (i) an oil phase,
    (ii) an aqueous phase; and,
    (iii) at least one surfactant;
    wherein the aqueous phase is distributed in the oil phase in the form of droplets having a diameter in the range 1 to 1000 nm or in the form of micro domains having at least one dimension of length, breadth or thickness in the range 1 to 1000 nm;

and, said step of injecting a composition comprises injecting said composition at a pressure below the hydraulic fracturing pressure of the reservoir.

2. The method according to claim 1, further comprising heating the fluid prior to said step of injecting.

3. The method of claim 1, wherein said supercritical fluid comprises supercritical carbon dioxide.

4. The method of claim 1, further comprising blending the microemulsion fluid with a component selected from the group consisting of carbon dioxide, methane, ethane, propane, nitrogen, air, water, and any combination thereof.

5. The method of claim 1, further comprising the step of recovering at least a portion of the microemulsion fluid from produced fluids.

6. The method of claim 5, further comprising the step of re-injecting recovered microemulsion into said injection well.

7. The method of claim 1, wherein the step of injecting comprises continual injection.

8. The method of claim 1, wherein the step of injecting comprises sequentially injecting more than one microemulsion fluid blend.

9. A method of improving the sequestering of gases in a subterranean reservoir comprising the step of:

injecting a fluid composition comprising a microemulsion fluid and a supercritical fluid into an injection well and then into said subterranean reservoir, said microemulsion fluid comprising:

(i) an oil phase,
(ii) an aqueous phase; and,
(iii) at least one surfactant;

said step of injecting a composition comprises injecting said composition at a pressure below the hydraulic fracturing pressure of the reservoir.

10. The method of claim 9, wherein the aqueous phase is distributed in the oil phase in the form of droplets having a diameter in the range 1 to 1000 nm or in the form of micro domains having at least one dimension of length, breadth or thickness in the range 1 to 1000 nm.

11. The method according to claim 9, further comprising heating the fluid prior to said step of injecting.

12. The method of claim 9, wherein said supercritical fluid comprises supercritical carbon dioxide.

13. The method of claim 9, further comprising blending the microemulsion fluid with a component selected from the group consisting of carbon dioxide, methane, ethane, propane, nitrogen, air, water, and any combination thereof.

14. The method of claim 9, further comprising the step of recovering at least a portion of the microemulsion fluid from produced fluids.

15. The method of claim 14, further comprising the step of re-injecting recovered microemulsion into said injection well.

16. The method of claim 9, wherein the step of injecting comprises continual injection.

17. The method of claim 9, wherein the step of injecting comprises sequentially injecting more than one microemulsion fluid blend.

* * * * *